United States Patent [19]
Hardin et al.

[11] Patent Number: 5,737,746
[45] Date of Patent: *Apr. 7, 1998

[54] COMPUTER SYSTEM INCLUDING AN APPARATUS FOR REDUCING POWER CONSUMPTION IN AN ON-CHIP TAG STATIC RAM

[75] Inventors: Jennefer S. Hardin, Orangevale; Robert F. Kubick; Brian K. Langendorf, both of El Dorado Hills, all of Calif.

[73] Assignee: Intel Corporation, Santa Clara, Calif.

[ * ] Notice: The term of this patent shall not extend beyond the expiration date of Pat. No. 5,430,683.

[21] Appl. No.: 415,600

[22] Filed: Apr. 3, 1995

Related U.S. Application Data

[63] Continuation of Ser. No. 213,034, Mar. 15, 1994, Pat. No. 5,430,683.

[51] Int. Cl.[6] .............................. G06F 13/00; G06F 1/26; G11C 11/413; G11C 7/00
[52] U.S. Cl. ..................... 711/118; 395/750.06; 365/227
[58] Field of Search ..................... 395/431, 445, 395/403, 494, 750.03, 750.04, 750.05, 750.06, 750.07; 365/227, 226, 196, 193, 233.5, 205, 189.01, 189.05

[56] References Cited

U.S. PATENT DOCUMENTS

| | | | |
|---|---|---|---|
| 4,932,001 | 6/1990 | Chow et al. | 365/233.5 |
| 5,018,061 | 5/1991 | Kishigami et al. | 711/3 |
| 5,325,335 | 6/1994 | Ang et al. | 365/205 |

*Primary Examiner*—Glenn Gossage
*Attorney, Agent, or Firm*—Blakely, Sokoloff, Taylor & Zafman

[57] ABSTRACT

A computer system includes an apparatus for conserving power in a tag static random access memory (SRAM). The computer system includes circuitry for placing the tags of the tag SRAM in a reduced power consumption state. The computer system also includes circuitry to power up the tag SRAM out of the reduced power consumption state while maintaining the integrity of the data stored in the tags. The computer system includes a bus, a processor, a cache memory and a memory controller. The memory controller is comprised of a tag static random access memory (SRAM) which includes sense amplifier circuitry and control logic for activating the tag SRAM in response to an address strobe signal (ADS#) from the processor initiating access to the tag SRAM. The memory controller further includes control logic for keeping the tag SRAM activated during an access cycle and for deactivating the tag SRAM, including the sense amplifier circuitry, upon completion of an access cycle to the tag SRAM, thereby placing the tag SRAM in a reduced power consumption state.

6 Claims, 6 Drawing Sheets

COMPUTER SYSTEM INCLUDING AN APPARATUS FOR REDUCING POWER CONSUMPTION IN AN ON-CHIP TAG STATIC RAM

This is a continuation of application Ser. No. 08/213,034, filed Mar. 15, 1994, now U.S. Pat. No. 5,430,683, issued Jul. 4, 1995.

BACKGROUND OF THE INVENTION

1. Field of the Invention

The present invention relates to the field of computers and computer systems. More specifically, the present invention relates to power reduction in integrated Static Random Access Memories (SRAMs) used as a cache tag array.

2. Description of Related Art

A microcomputer system generally comprises a microprocessor, a memory subsystem, a bus and other peripherals. The microprocessor executes instructions and the memory subsystem stores data and instructions for the microprocessor. The bus serves as a communication pathway between the microprocessor and other devices in the computer system.

The memory subsystem typically comprises some slow and inexpensive memory such as Dynamic Random Access Memory (DRAM) and fast and expensive memory such as SRAMs. While many personal computer system memories have gotten faster over the years, the increase in the speed of system memory comprised of Dynamic Random Access Memory (DRAM) has not kept pace with the increase in microprocessor speeds.

To maximize system performance, microprocessor system designers are incorporating cache memories into the system memory configurations. Cache memories are very fast local memories usually made up of fast and expensive Static Random Access Memory (SRAM). Cache memories are used for temporarily storing copies of data and instructions used by the microprocessor. The microprocessor can retrieve a copy of data from the cache memory faster than from the slow main system memory (e.g., DRAMs) because the access times of the main system memory are longer. Therefore, the use of cache memories can significantly improve the performance of the computer system by circumventing the long access time to the main system memory in favor of the short access times of the cache memories.

Computer systems often include a memory controller to coordinate memory accesses. Some prior art systems use a tag SRAM array as a part of a memory controller. The tag SRAM functions as a look-up table to addresses stored therein which correspond to each separate address in memory. Each address is stored in a separate entry, referred to as a tag. In this way, the tag SRAM identifies the data that is currently stored in a cache memory. When the microprocessor requests information from main memory, the memory request is initially sent to a cache memory. As information is copied into the cache memory, its main memory address is stored in the tag SRAM. The tag SRAM not only holds the original main system memory addresses of code and data stored in the cache memory, but also additional status bits used by a cache management logic to determine when the tag SRAM is being accessed. The cache management logic takes a memory request from the microprocessor and compares it with an entry in the tag SRAM. When the memory request address matches an address stored in the tag SRAM, the cache memory returns the information requested by the microprocessor. If the memory request address does not match any entry in the tag SRAM, the memory request is passed on to main memory.

Storing cache memory addresses in the tag SRAM requires circuitry in the tag SRAM to be on during most of the computer system up-time to enable data to be read from and written to the tag SRAM. Having the tag SRAM on all the time presents some problems. One of these problems is that because of its high performance nature, the tag SRAM consumes a lot of power and dissipates a lot of heat. The high heat dissipation of the tag SRAM makes it difficult to package it in low cost packages like plastic. The high power consumption of the tag SRAM also contributes to an increase in the overall system power consumption which adversely affects the overall system performance of many prior art computer systems.

To handle the power consumption by the tag SRAM and other components, many prior art systems use bigger power supplies, better cooling mechanisms, and more system board space to accommodate these components and in order not to degrade the overall system performance.

In an effort to increase system performance by reducing the heat generated by the tag SRAM, prior art system designers also package the tag SRAM in ceramics. Although ceramic packaging helps dissipate heat generated by prior art systems, it can be very expensive and it does not solve the power consumption problem of the tag SRAM.

To reduce the power consumption by the tag SRAM and the extra cost associated with using such memories in computer systems, a method and apparatus for incorporating the high performance of a cache memory with the low packaging cost of DRAM memory is needed. The present invention provides a method and apparatus for reducing power consumption of a tag SRAM used with cache memories or in memory controllers, so that the amount of heat dissipated can be reduced without impacting the performance of the tag SRAM. The present invention also provides a memory controller that combines the high performance of an integrated tag SRAM with the low cost packaging of DRAMs.

SUMMARY OF THE INVENTION

A computer system including an apparatus for reducing power consumption tag SRAM is described. The apparatus of the present invention includes a processor which generates write and read cycles to computer system memory. The apparatus also includes a memory subsystem which includes a main system memory, a memory controller and a cache memory. The main system memory is used to store data and instructions for the processor and the cache memory is used to store a copy of the data and instructions in the main system memory that the processor frequently accesses.

The memory controller of the present invention is integrated with a tag Static Random Access Memory (tag SRAM) for controlling access to the main system memory and the cache memory. The tag SRAM holds the addresses of the data and instructions stored in the cache memory. The memory controller of the present invention also includes a tag state machine controller which detects when a tag access begins and ends in order to turn the tag on or off, thereby placing the tag SRAM array in a reduced power consumption state.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE INVENTION

A computer system including an apparatus for reducing power consumption in a tag Static Random Access Memory is described. In the following description, numerous specific details are set forth, such as types and sizes of cache memories and memory configurations, etc., in order to provide a thorough understanding of the present invention. It will be apparent, however, to one of ordinary skill in the art, that the present invention may be practiced without these specific details. In other instances, well known methods and circuits are not described in detail in order not to obscure the present invention.

In one embodiment, the present invention integrates a tag SRAM array in a memory controller. By integrating a tag SRAM array in the memory controller, the present invention increases the performance of cycles that access a second level cache memory in a computer system. The integration of a tag SRAM array for the L2 cache memory in the memory controller also reduces the load on the address lines in the computer system, which is important for high frequency operation.

In the prior art, the tag SRAM is normally off-chip (a separate chip by itself) requiring separate address lines on the system board to access the tags. A memory request by the processor is sent in parallel to the memory controller and the tag SRAM, thereby increasing the load on the address lines. By having the tag SRAM array on-chip in the memory controller, address accesses to the tag SRAM may be made more readily by the memory controller and the need for extra address lines to access the tag SRAM is reduced. The on-chip tag SRAM also eliminates the need for external tag SRAM control signals resulting in reduced pin cost for the cache controller (e.g., memory controller), a reduced pin count for the cache controller reduces cost, and also simplifies computer system design. Furthermore, with the tag SRAM array in the memory controller, the time taken to access the tags and get data to the processor is reduced as a result of the reduced load on the address lines in the computer system.

Although integrating the tag SRAM in the memory controller may result in the memory controller dissipating a lot of heat, the method of turning on and off the tag SRAM of the present invention helps in reducing the amount of heat generated by the overall system, as a result of the significant reduction in power consumed by the tag SRAM array, without impacting its performance.

Figure 1:
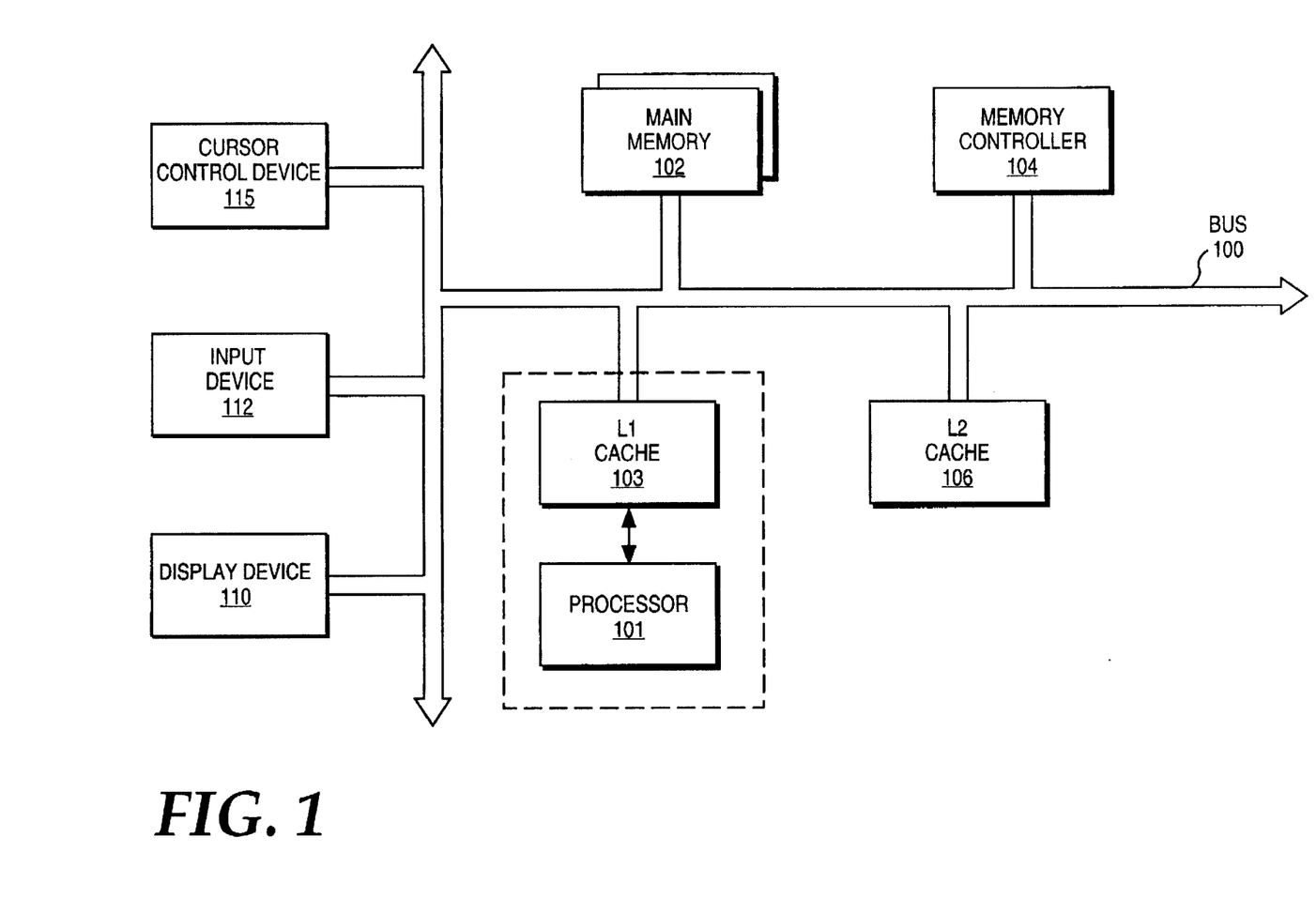
FIG. 1 is a block diagram of one embodiment of the computer system of the present invention.

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further details are set forth with reference to the other Figures provided with this specification. Furthermore, the present invention is described with reference to its preferred embodiment; alternative embodiments which may be conceived by one of ordinary skill in the art are considered within the scope of the claims set forth below.

As illustrated in FIG. 1, a computer system of the present invention generally comprises a bus 100 for communicating information, a processor 101 coupled to the bus 100 for processing instructions, and a main memory 102 coupled to the bus 100 for storing data and instructions for the processor 101. On-chip L1 cache memory 103 is shown coupled to the bus 100 for temporarily storing frequently accessed instructions and data for the processor 101. Information is retrieved from the main memory 102 for the processor 101 and stored in the L1 cache memory 103. Memory controller 104 is also shown coupled to the bus 100 for controlling access to the main memory 102 and the L2 cache memory 106. L2 cache memory 106 is coupled to the bus 100 for holding copies of data stored in the L1 cache memory 103 and also the main memory 102.

The computer system also includes a display device 110 such as a cathode ray tube or liquid crystal display, coupled to the bus 100 for displaying information to the computer user, an alphanumeric input device 112, such as a keyboard, including alphanumeric and other keys coupled to the bus 100 for communicating information and command selections to the processor 101 and a cursor control device 115, such as a trackball or stylus, is coupled to the bus 100 for cursor movement.

Certain implementations and uses of the computer system of the present invention may not require nor include all of the above components. For example, in certain implementations, a keyboard 112 and cursor control device 115 for entering information to the system may not be required. In other implementations, it may not be required to provide a display device 110.

Figure 2:
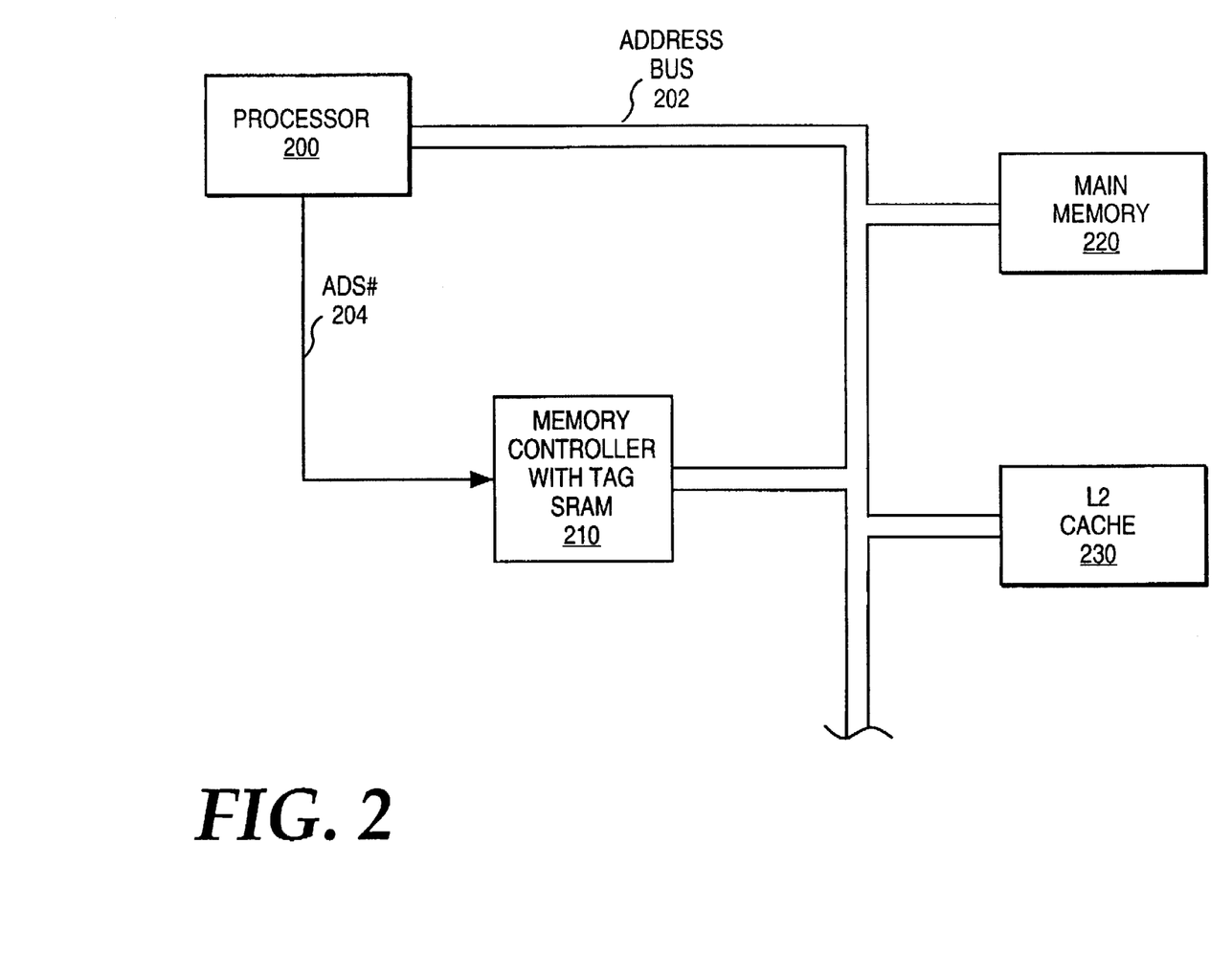
FIG. 2 is a block diagram of a computer system using the currently preferred embodiment of the memory controller of the present invention.

FIG. 2 is a block diagram illustrating a preferred embodiment of the present invention. Referring to FIG. 2, processor 200 is shown coupled to address bus 202 and address strobe signal (ADS#) signal line 204. The ADS# signal line 204 is labeled with a "#" to indicate that the ADS# signal is low when asserted (i.e., active low). Memory controller 210 integrated with tag SRAM is coupled to the processor 200 via the ADS# signal line 204. Main memory (DRAM) 220 is coupled to the memory controller 210 via address bus 202. A second level (L2) cache memory 230 also is coupled to the memory controller 210 via the address bus 202.

The processor 200 processes instructions and data in the computer system of the present invention. The processor 200 also generates the ADS# signal to initiate a read or a write cycle to the memory subsystem in a manner well known in the art. However, the present invention uses the generation of the ADS# signal by the processor 200 in determining whether to assert or deassert a Chip Select signal (CS#) of the memory controller 210 to turn the tag SRAM in the memory controller 210 on or off.

The memory controller 210 integrated with the tag SRAM controls access by the processor 200 to the main memory 220 and the L2 cache memory 230. The main memory 220 stores data and instructions for the processor 200. The L2 cache memory 230 is a second layer of high speed memory between a first level cache (not shown in FIG. 2) and the main memory 220. The L2 cache memory 230 holds copies of instructions and data frequently requested by the processor 200 and handles the more random memory requests that the first level cache memory misses. In order to simplify the handling of requests that might miss the first level cache memory, the L2 cache memory 230 is almost always larger than the first level cache memory to improve the chances of having the data or instructions in the L2 cache memory 230. For example, the L2 cache memory 230 may be 64 KB to 512 KB larger than the first level cache. The operation of the L2 cache memory 230 is well known in the art.

Figure 3:
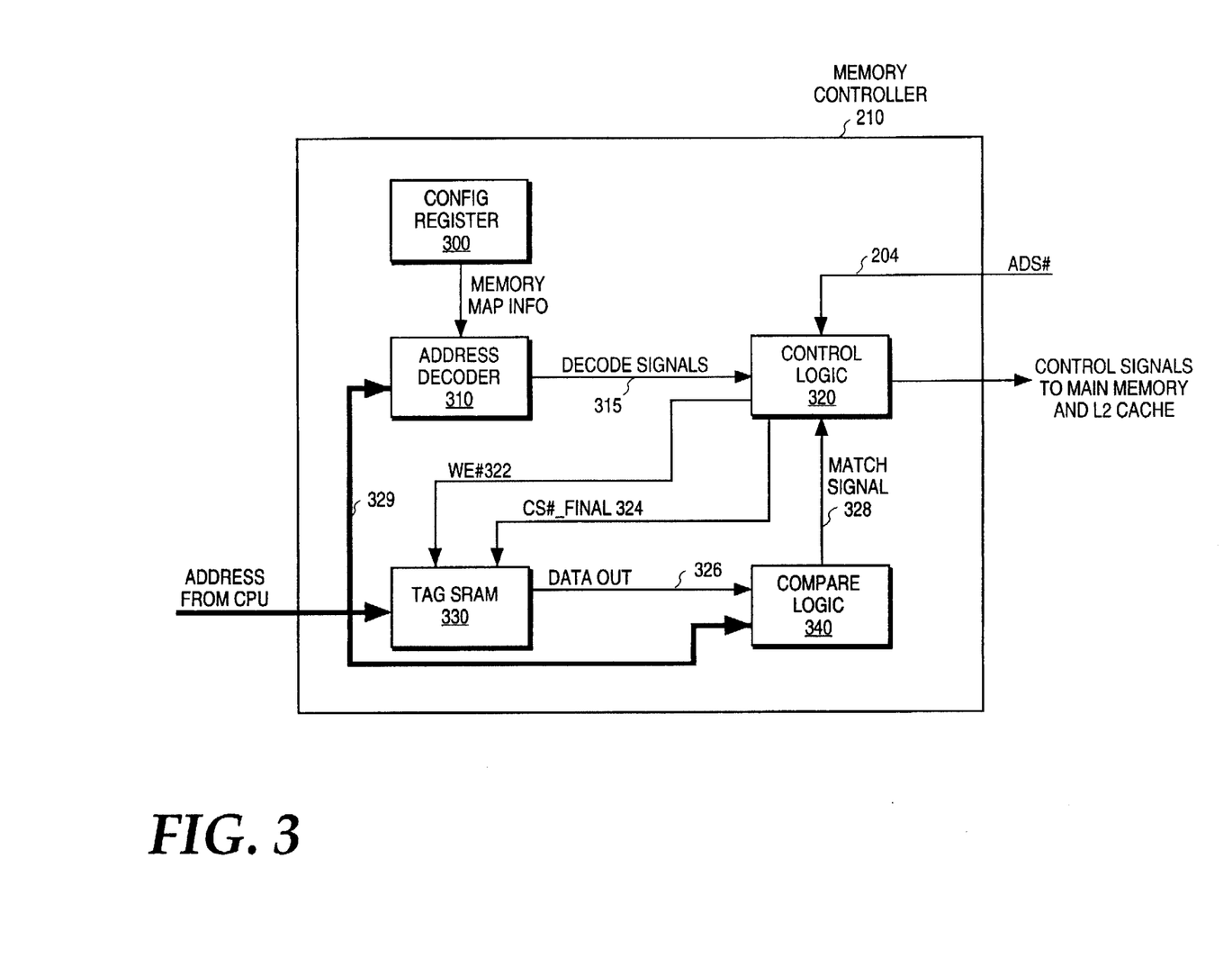
FIG. 3 is a block diagram of the currently preferred embodiment of the memory controller of the present invention.

FIG. 3 is a block diagram illustrating one embodiment of the internal architecture of the memory controller 210 of the present invention. The components and operations of the memory controller 210 are well known in the art. However, the memory controller 210 is integrated with tag SRAM to reduce the access time for tag lookups in the L2 cache memory 230. (see FIG. 2.) Returning to FIG. 3, the memory controller 210 includes a memory configuration register 300 coupled to an address decoder 310. Address decoder 310 is coupled to control logic 320 via decode signal lines 315. Control logic 320 is coupled to the tag SRAM 330 via a Write Enable (WE#) signal on line 322 and a Chip Select (CS#_final) signal on line 324. The tag SRAM 330 is also coupled to compare logic 340 via a data out line 326. Compare logic 340 is also coupled to control logic 320 via match signal on line 328 and to address decoder 310 via address line 329.

The memory configuration register 300 stores memory map information for memory devices installed in the computer system of the present invention, such as the address range of the memories, the number of clocks for a read or write access to system memory, etc. The address decoder 310 decodes address signals generated by the processor 200 for the memory controller 210. After decoding an address, the address decoder 310 generates a decode signal on line 315 to the control logic 320 which determines whether an address generated by the processor 200 goes to main memory 220 or to the L2 cache memory 230.

The control logic 320 comprises logic that generates control signals to the memory subsystem in response to access requests by the processor 200. The control logic 320 also generates a write enable signal (WE#) on line 322 to the tag SRAM 330 to indicate a write to the tags. The control logic 320 also generates a chip select signal (CS#_final) on line 324 which when asserted turns on circuitry, such as the sense amps, which consume a lot of power because of their direct current (DC) requirement, in the tag SRAM 330 and which when deasserted, turns off circuitry in the tag SRAM 330. Control logic 320 generates the chip select signal on line 324 in response to an assertion of the ADS# signal on line 204. When ADS# signal is generated by the processor 200 to indicate a memory request to either main memory 220 or cache memory 230, the control logic 320 asserts the chip select signal on line 324 to turn on the tag SRAM 330 to be accessed. After an access to the tag SRAM 330 is completed, the control logic 320 deasserts the chip select signal on line 324 to turn off circuitry, such as the sense amps, which are not needed to store data in the tag SRAM 330. The control logic 320 also includes various state machines, such as the tag controller state machine, in the memory controller 210.

The tag SRAM 330 is integrated in the memory controller 210 and functions as a look-up table storing addresses which correspond to separate data blocks in the L2 cache memory 230. If an address generated by the processor 200 for a cycle (e.g., read or write cycle) is held in the tag SRAM 330, the data requested by the processor 200 is stored in the L2 cache memory 230 and the specified cycle is serviced out of the L2 cache memory 230. Since information in the tag SRAM 330 indicates that requests by the processor 200 may be serviced out of the L2 cache memory 230, the memory controller 210 needs the information before it can start generating appropriate control signals. It is therefore critical that the time to access the data in the tag SRAM 330 be reduced in order to reduce the overall access time to the L2 cache memory 230. The tag data output, therefore, needs to be available as soon as possible after a new address is generated by the processor 200.

The compare logic 340 comprises logic that compares the data from the tag SRAM 330 sent via the data out line 326 with the address from the processor 200 for the current read or write cycle. If the two addresses match, compare logic 340 asserts a match signal on line 328 to the control logic 320 to indicate that the data for the current cycle is stored in the L2 cache memory 230. The control logic 320 then asserts the proper control signals to either read or write data to the L2 cache memory 230. If the two addresses do not match, the data for the current cycle is in the main memory 220.

Figure 4:
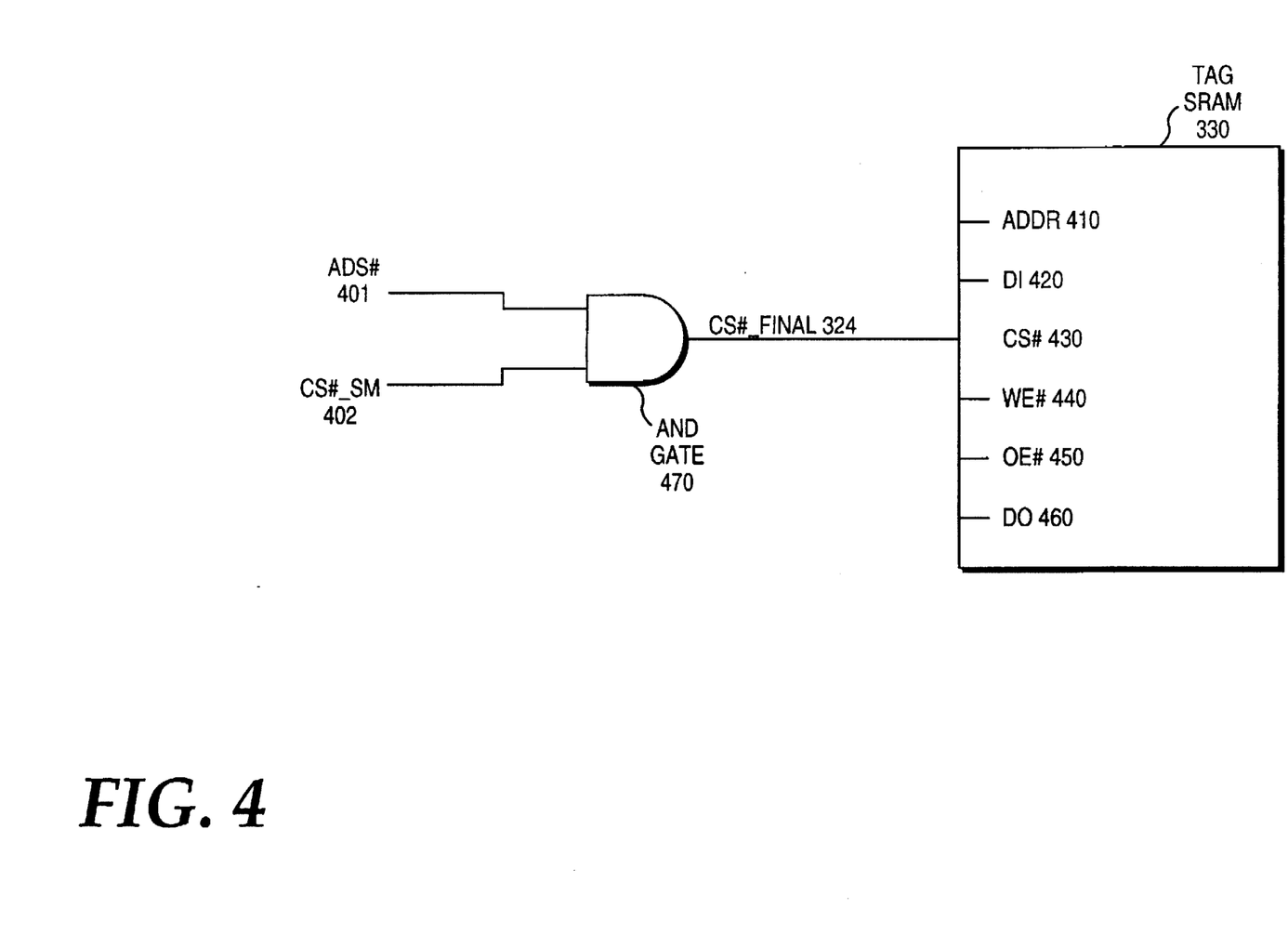
FIG. 4 is a block diagram of one embodiment of logic circuitry for generating a chip select signal to the tag SRAM of the present invention.

FIG. 4 is a block diagram illustrating one embodiment of the logic circuitry for generating a chip select signal to the tag SRAM of a preferred embodiment of the present invention. Referring to FIG. 4, the tag SRAM 330 includes an address pin (ADDR) 410, a Data Input pin (DI) 420, a chip select signal pin (CS#) 430, a Write Enable signal pin (WE#) 440, an Output Enable signal pin (OE#) 450, and a Data Output pin (DO) 460. The tag SRAM 330 also includes sense amps (not shown). The components and operation of the tag SRAM 330 are well known in the art. The logic circuitry also includes an AND gate 470 which is coupled to the tag SRAM 330 via Chip Select_final (CS#_final) signal on line 324.

In the preferred embodiment of the present invention, the processor 200 initiates a read or a write cycle by generating an ADS# signal on line 401 to the memory controller 210 to indicate the start of a new cycle. The memory controller 210, in response to the assertion of the ADS# signal on line 401 by the processor, asserts a chip select (CS#_sm) signal on line 402 asynchronously to the tag SRAM 330 to turn on circuitry in the tag SRAM 330. Because the ADS# signal on line 401 is only valid for one clock cycle and is driven onto the memory controller 210 through an input buffer (e.g., this is the case with many advanced processors), the timing of the ADS# signal on line 401 is slightly different than the timing of the CS#_sm signal on line 402 which is generated off of an internal flip-flop of the memory controller 210 in a manner known in the art. Therefore, the present invention uses the ADS# signal on line 401 and the CS#_sm signal on line 402 as inputs to the AND gate 470 to generate a signal CS#_final signal 324 which holds the chip select pin 430 active in all subsequent cycles which access the tag SRAM 330.

The present invention uses the assertion and the deassertion of the CS#_final signal 324 to turn on and off respectively the power and other circuitry in the tag SRAM 330, such as the sense amps, that are not needed to store any tag data, but needed for accessibility to the tags. Turning circuitry off that is not needed for data storage in the tag affects tag accessibility and not the integrity of data stored in the tag SRAM 330 while the tag SRAM 330 is in a reduced power consumption state. By design, the chip select pin 430 of the tag SRAM 330 controls the power features of the tag SRAM 330. The memory controller 210, by asserting the CS#_final signal 324 (e.g., CS#_final signal is low), allows data to be read from the tag SRAM 330 by causing the chip select pin 430 to be low.

When the chip select pin 430 is low, power to the tag SRAM 330 is automatically turned on. When powered, the tags to the tag SRAM 330 are on and accessible. The deassertion of the CS#_final 324 causes the chip select pin 430 to be high. Once the chip select pin 430 is high, power to the tag SRAM 330 is automatically reduced (tags turned off) and the tags remain in a reduced power consumption state until the CS#_final signal is asserted again. In this manner, the power consumption of the tag SRAM 330 is either reduced or increased by the deassertion or assertion of the chip select signal. This also results in an increase or decrease in the amount of heat dissipated by the tag SRAM 330.

There is a finite amount of time (on the order of about 10-20 nanoseconds) from the CS#_final 324 transitioning from high to low until the tags are ready to be read or written to. The time from the CS#_final signal 324 being driven low until the tag SRAM 330 drives out a valid data is referred to as a Tac (access time from CS# signal). The Tac enables the memory controller 210 to determine how many cycles it takes for the tag SRAM 330 to be powered up in order to read or write data to the tag SRAM 330. In order to access the tags as quickly as possible, the memory controller 210 drives the CS#_final signal 324 low as soon as a new address is generated by the processor 200 to start a new cycle. Therefore, it is important for the memory controller 210 to know what the Tac is in order for the tag controller state machine to transition from one state to another state.

Figure 5:
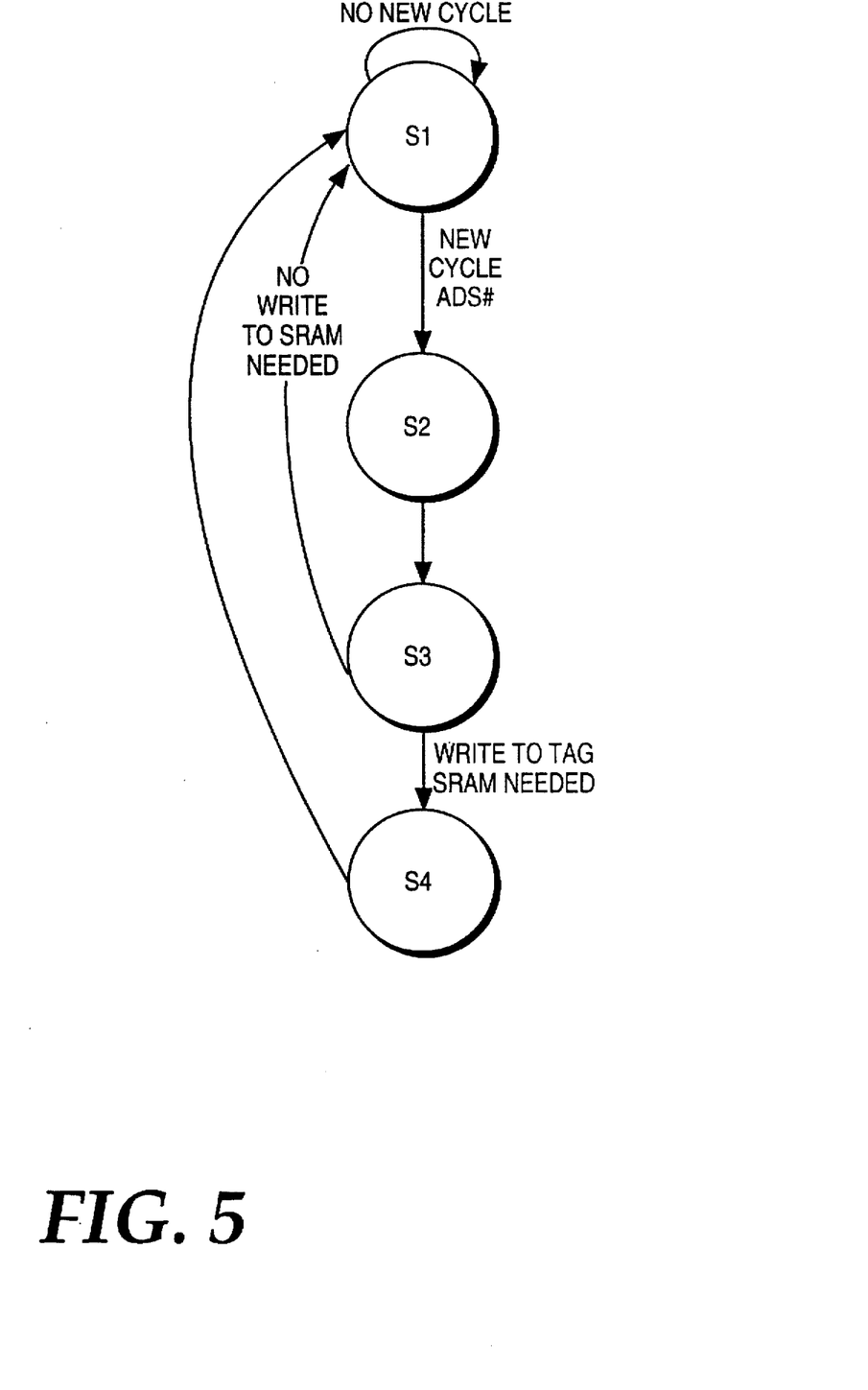
FIG. 5 is a tag controller state diagram for the tag SRAM.

FIG. 5 is a diagram of one embodiment of a tag controller state machine of the present invention. Referring to FIG. 5, when a cycle (read or write) is not being driven on the address bus 202, the tag controller state machine is idle (state S1), the CS#_final signal 324 is high, and the tag SRAM 330 is off and not consuming any power. During state S1, the CS#_final signal 324 is only driven low if a new cycle is driven on the address bus 202, which is indicated by the ADS# signal being driven low by the processor 200. The tag controller state machine transitions from state S1 to state S2 when it detects a high-to-low transition of the ADS# signal. In order to access the tag data as soon as a new cycle is driven on the address bus 202, the assertion of the ADS# signal is an indication to the memory controller 210 to turn on the tags. This is done via the AND gate 470 described in FIG. 4. The CS#_sm signal, generated by the tag controller state machine, is always high during state S1 and does not affect the output of the AND gate 470.

In state S2, the tag SRAM 330 is on and dissipating power. The CS#_sm signal is driven low by the tag controller state machine and the ADS# signal is released. The ADS# signal is only driven low for one clock. Because the ADS# signal is only driven low for one clock, the CS#_sm signal is held low for the rest of the time that the tag SRAM 330 is accessed in order to enable the CS#_final signal 324 to be low for the entire tag access.

During state S2, the tag access is not completed. Therefore, even though the tags are on, valid data is not being driven out of the tag SRAM 330. This is because the Tac has not yet passed since the initial assertion of the CS#_final signal 324. At the next clock edge, the state machine transitions to state S3.

In state S3, the CS#_sm signal and CS#_final signal are still held low by the tag controller state machine and the tag SRAM 330 drives valid data. The tag controller state machine latches a copy of the data being driven, if needed for the rest of the cycle. The tag controller state machine uses the information from the tag data to determine if the processor 200 cycle may be serviced out of the L2 cache memory 230 or from main memory 220. The tag controller state machine transitions from state S3 to state S4 if a write to the tag SRAM 330 is required. If a write to the tag SRAM 330 is not required, the tag SRAM 330 is not accessed and the tag controller state machine transitions from state S3 to state S1.

In state S4, if a write is required to the tag SRAM 330, the tag controller state machine continues to hold the CS#_sm signal low which in turn holds the CS#_final 324 low in order to perform a write to the tags. In state S4, the tag controller state machine updates the tag SRAM 330 by asserting the write enable signal 440 to the tag SRAM 330 which writes new data into the tag SRAM 330. After data has been written to the tag SRAM 330, the tag controller state machine transitions back to state S1.

Figure 6:
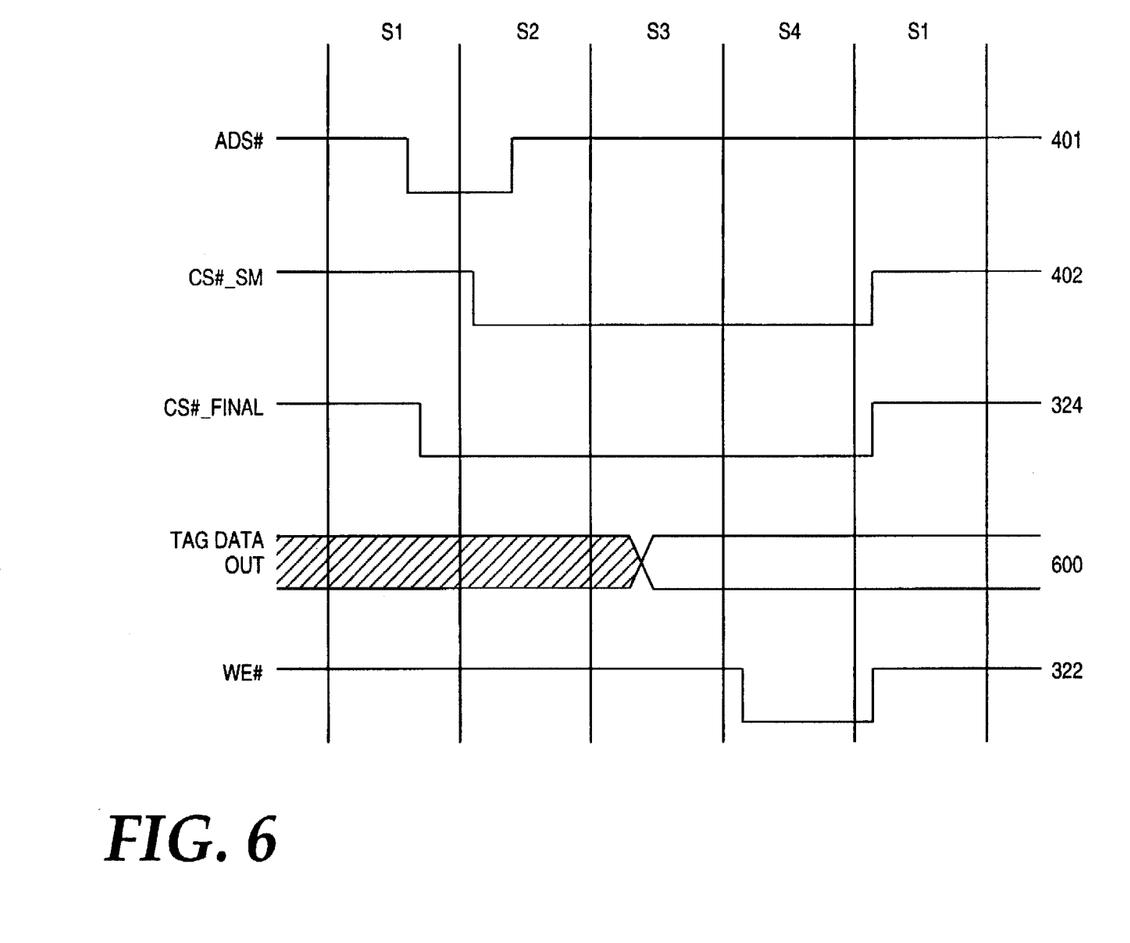
FIG. 6 is a waveform diagram for one embodiment of a write cycle of the tag SRAM.

FIG. 6 is a waveform diagram of the tag controller state machine illustrating a read and a write cycle to the tag SRAM 330 of the present invention. Referring to FIG. 6, the processor 200 asserts the ADS# signal on line 401 during state S1 to initiate the start of a read cycle to the tag SRAM 330. The assertion of the ADS# signal by the processor 200 causes the memory controller 210 to assert the CS#_final signal 324 to the tag SRAM 330, because CS#_sm is logic high. By asserting the CS#_final signal 324, the tags in the tag SRAM 330 are turned on. Since the tag controller state machine is still idle in state S1 and the ADS# signal is asserted for only one clock, the tag controller state machine asserts the CS#_sm signal on line 402 in state S2 to sustain the CS#_final signal 324. The assertion of CS#_sm signal keeps the tag SRAM 330 on.

In state S3, the memory controller 210 starts the next cycle which is a write cycle to the tags. The write cycle commences with the assertion of the WE# signal in the beginning of state S4. After a write is completed, the memory controller deasserts the CS#_final signal 324 which turns off the tags in the tag SRAM 330. By turning off the tags, power consumption by the tag SRAM 330 can be reduced. This, in effect, leads to an overall reduction in the consumption of power by the computer system. The reduction in power consumption can significantly enhance the overall performance of the computer system.

Although the present invention has been described herein with reference to a specific preferred embodiment, many modifications and variations therein will readily occur to those skilled in the art. Accordingly, all such variations and modifications are included within the intended scope of the present invention as defined by the following claims.

Thus a method and an apparatus for turning on and off the tags in a tag SRAM has been described.

We claim:

1. A computer system comprising:
   bus means for communicating data; processing means coupled to the bus means for processing data, wherein the processing means generates a memory request that includes a first signal initiating a memory access cycle;
   cache memory means coupled to the bus means for storing information frequently requested by said processing means;
   a memory control means coupled to the bus means and said processing means, said memory control means including:

a tag static random access memory (SRAM) for storing addresses and including sense amplifier circuitry, a control logic means for generating a second signal for activating said tag SRAM and said sense amplifier circuitry in response to the first signal initiating the access cycle to said SRAM, said control logic means being coupled to said tag SRAM, the control logic means further for generating a third signal coupled to said tag SRAM by logically combining the first and second signals, said third signal for keeping said tag SRAM and said sense amplifier circuitry activated during the entire access cycle and for deactivating said tag SRAM and said sense amplifier circuitry upon completion of an access cycle to said tag SRAM, thereby placing said tag SRAM in a reduced power consumption state.

2. The computer system of claim 1 wherein said first signal comprises an address strobe signal.

3. The computer system of claim 1 wherein said control logic means is responsive to said second signal being de-asserted to deactivate said tag SRAM.

4. A computer system comprising:

a bus;

a processor coupled to said bus, wherein the processor processes information and generates memory access requests;

a cache memory coupled to said bus, said cache memory storing information frequently requested by said processor;

a memory controller coupled to said bus to control access to said cache memory by said processor, wherein said memory controller comprises:

a tag SRAM storing addresses, said tag SRAM including sense amplifier circuitry, and a logic circuit coupled to said tag SRAM, the logic circuit receiving a first control signal and an access initiation signal, the first control signal being generated in response to the access initiation signal being provided by said processor to said memory controller, said logic circuit generating a second control signal by logically combining said control signal and said access initiation signal, said second control signal keeping said tag SRAM and said sense amplifier circuitry activated during the entire access cycle and powering down said tag SRAM and said sense amplifier, thereby placing said tag SRAM in a reduced power consumption state, upon detecting a completion of an access cycle to said tag SRAM.

5. The computer system of claim 4 wherein said access initiation signal initiates said access cycle and comprises an address strobe signal.

6. The computer system of claim 4 wherein second control signal is de-asserted by the logic circuit in response to a de-assertion of said first control signal to power down said tag SRAM and said sense amplifier circuitry.

* * * * *